United States Patent [19]

Kakimoto

[11] Patent Number: 5,351,316
[45] Date of Patent: Sep. 27, 1994

[54] IMAGE PROCESSING APPARATUS

[75] Inventor: Masakazu Kakimoto, Aichi, Japan

[73] Assignee: Ushio Co., Ltd., Aichi, Japan

[21] Appl. No.: 110,211

[22] Filed: Aug. 23, 1993

Related U.S. Application Data

[63] Continuation of Ser. No. 818,909, Jan. 10, 1992, abandoned.

[30] Foreign Application Priority Data

Feb. 18, 1991 [JP] Japan .................. 3-023311

[51] Int. Cl.$^5$ ............................................. G06K 9/20
[52] U.S. Cl. ...................... 382/65; 359/362; 282/8
[58] Field of Search .................. 382/65, 59, 66, 67, 382/68, 8; 359/362, 365, 366, 372, 379; 348/87, 94

[56] References Cited

U.S. PATENT DOCUMENTS

| | | | |
|---|---|---|---|
| 3,968,476 | 7/1976 | McMahon | 382/65 |
| 4,630,225 | 1/1986 | Hisino | 382/8 |
| 4,641,357 | 2/1987 | Satoh | 382/65 |
| 4,668,983 | 5/1987 | Werson | 382/8 |
| 5,027,424 | 6/1991 | Yamazaki et al. | 382/65 |
| 5,060,283 | 10/1991 | Shiraishi | 382/65 |

FOREIGN PATENT DOCUMENTS

| | | |
|---|---|---|
| 318249 | 5/1989 | European Pat. Off. . |
| 57-67815 | 4/1982 | Japan . |
| 59-65205 | 4/1984 | Japan . |
| 1245111 | 9/1989 | Japan . |
| 1259213 | 10/1989 | Japan . |
| 2040506 | 2/1990 | Japan . |
| 2238115 | 5/1991 | United Kingdom . |

OTHER PUBLICATIONS

Patent Abstract of Japan, vol. 14, No. 199(P-1040) Apr. 23, 1990.
Patent Abstract of Japan, vol. 14, No. 8 (P-987) Jan. 10, 1990.
Patent Abstract of Japan, vol. 13, No. 580 (P-980) Dec. 21, 1989.
Patent Abstract of Japan, vol. 8, No. 169 (P-292) (1606) Aug. 4, 1984.
Patent Abstract of Japan, vol. 6, No. 145 (P132) Aug. 4, 1982.
European Search Report and Annex.

Primary Examiner—Joseph Mancuso
Attorney, Agent, or Firm—Sandler, Greenblum & Bernstein

[57] ABSTRACT

The present invention provides an image processing apparatus capable of forming a sharp image of a detection mark formed in a plane. The image processing apparatus comprises a camera unit (1) comprising a lens system (12) and a photodetecting device (13) inclined at a predetermined angle to the optical axis (L') of the lens system. The camera unit (1) is disposed with the optical axis (L') of the lens system (12) inclined at a predetermined angle to a perpendicular line (L) to the plane including the detection mark so that the difference in length between respective sections of light paths between diametrically opposite portions of the detection mark and the lens system is canceled by the difference in length between respective sections of the same light paths between the lens system and the photodetecting device.

4 Claims, 1 Drawing Sheet

IMAGE PROCESSING APPARATUS

This application is a continuation of application Ser. No. 07/818,909, filed Jan. 10, 1992, now abandoned.

BACKGROUND OF THE INVENTION

1. Field of the Invention

The present invention relates to an image processing apparatus and, more specifically, to an image processing apparatus to be incorporated into a machine tool, such as a punching machine, for detecting and determining machining points by image processing, incorporating improvements in the image forming accuracy of a camera unit for taking detection marks indicating machining points and the like.

2. Description of the Prior Art

A conventional image processing apparatus has a camera unit comprising a lens system including a filter through which incident light, namely, light reflected by or transmitted through a detection mark (reference mark), is received, lenses and a diaphragm, and a photodetecting device, such as a CCD, disposed behind the lens system so that the incident light is focused thereon. The image processing apparatus is set with its optical axis inclined at a predetermined angle to a perpendicular line to a plane including a detection mark.

This image processing apparatus is set with its optical axis inclined at a predetermined angle to a perpendicular line to a plane including a detection mark, such as a circle or a cross, formed on a flat work, such as a plate, when the punch of a machine tool, such as a punching machine, is disposed on the perpendicular line to the plane including the detection mark and it is impossible to set the camera unit on the perpendicular line. The image of the detection mark received through and focused on the photodetecting device by the lens system is analyzed by a controller connected to the photodetecting device to calculate data for operating the machine tool and to control the operation of the machine tool.

Since the camera unit of this conventional image processing apparatus is set with its optical axis inclined to the detection mark formed on a plane, a light path between the camera unit and a portion of the detection mark nearer to the camera unit and a light path between the camera unit and a portion of the detection mark farther from the camera unit are different from each other in length. Therefore, portions of the image of the detection mark focused on the photodetecting device farther from the center of the detection mark are inferior in sharpness to portions of the same nearer to the center of the detection mark, and such portions having inferior sharpness makes the subsequent image analysis and calculation inaccurate.

SUMMARY OF THE INVENTION

Accordingly, it is an object of the present invention to provide an image processing apparatus provided with a camera unit capable of forming sharp images of the entire portions of a detection mark formed on a plane.

To achieve the object, the present invention provides an image processing apparatus to be disposed with its optical axis inclined at an angle to a perpendicular line to a plane including an objective detection mark, comprising a camera unit comprising a lens system for receiving light from the detection mark, and a photodetecting device disposed behind the lens system so that the image of the detection mark is focused thereon, characterized in that the photodetecting device is inclined at a predetermined angle to the optical axis of the lens system of the lens unit.

Since the photodetecting device is inclined to the optical axis of the lens system, the difference in length of the optical paths between portions of the detection mark and the camera unit can be canceled by the difference in length of the corresponding optical paths within the camera unit and hence the respective lengths of the optical paths between portions of the detection mark and the photodetecting device are the same. Accordingly, the sharp images of entire portions of the detection mark formed on a plane can be formed to enable accurate image processing, and thereby the machining accuracy of the associated machine tool, such as a punching machine, can be improved.

Furthermore, since the angle between the optical axis of the lens system and the photodetecting device can be changed, the image processing apparatus of the present invention is applicable to an existing machine tool, and the present invention is applicable to an existing image processing apparatus mounted on a machine tool, requiring simple modification of the base plate supporting the photodetecting device.

DESCRIPTION OF THE PREFERRED EMBODIMENT

An image processing apparatus in a preferred embodiment according to the present invention as applied to a punching machine will be described hereinafter with reference to the accompanying drawings.

Figure 1:
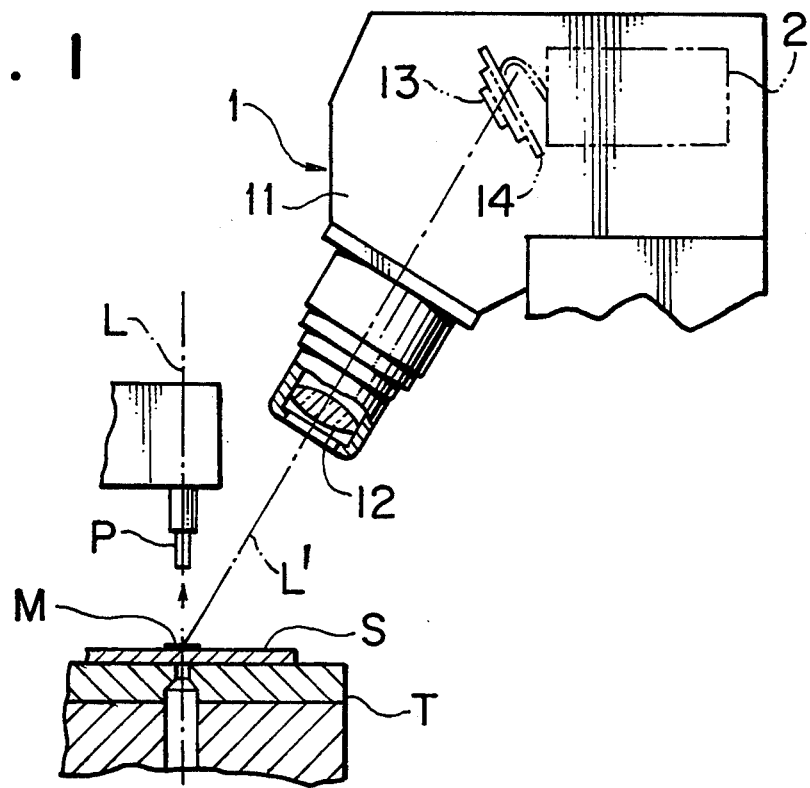
FIG. 1 is a partly cutaway side view of an image processing apparatus in a preferred embodiment according to the present invention.

Referring to FIG. 1, a detection mark M is formed on a flat member S, such as a work or a detection mark storing/processing sheet, placed on a work table T so as to be included in the surface of the flat member S. A punch P for punching a hole in the work is supported right above the work table T for vertical movement along a perpendicular line L to the plane including the detection mark M and passing the center of the detection mark M.

A camera unit 1 has a case 11, a lens system 12 projecting from the lower end of the case 11, a base plate 14 provided within the case 11, and a photodetecting device 13 supported on the base plate 14 within the case 11 at a predetermined angle to the optical axis L' of the lens system 12. The camera unit 1 is set with the optical axis L' of the lens system 12 at a predetermined angle to the perpendicular line L so that the camera unit 1 may not interfere with the punch P. The photodetecting device 13 is disposed behind the lens system 12 on the optical axis L' of the lens system 12.

Figure 2:
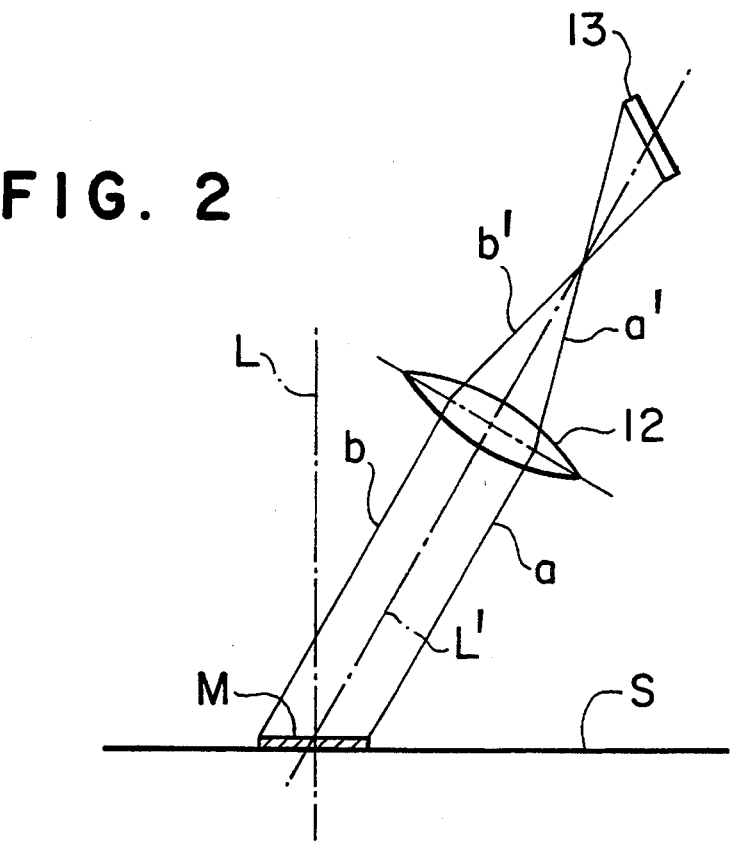
FIG. 2 is a diagrammatic view of assistance in explaining a principle on which the present invention is based.

The angle of inclination of the photodetecting device 13 to the optical axis L' is determined so as to meet an optical geometry shown in FIG. 2, in which the sum of the length a of a section of an optical path between a portion of the detection mark M on the side of the camera unit 1 and the lens system 12 and the length a' of a section of the same optical path between the lens system 12 and the photodetecting device 13, i.e., $a + a'$, is equal to the sum of the length of a section of an optical path between a portion of the detection mark M diametrically opposite the portion of the same on the side of the camera unit 1 and the lens system 12 and the length b' of a section of the same optical path between the lens system 12 and the photodetecting device 13, i.e., b+b' are equal; that is, $(a+a)' = (b+b)'$. Thus, the difference between the lengths a and b of the external sections of the optical paths between the detection mark M and the camera unit 1 (the lens system 12) is canceled by the difference between the lengths a' and b' of the internal sections of the optical paths between the lens system 12 and the photodetecting device 13. The angle of inclination of the photodetecting device 13 to the optical axis L' can simply be determined by adjusting the inclination of the base plate 14.

The photodetecting device 13 is a component of a controller for image analysis and calculation. The image formed by the photodetecting device 13 is converted into equivalent electric signals by a converter 2.

Since the camera unit 1 can be set so that $(a+a')=(b+b')$, sharp images of the entire portions of the detection mark M can be formed. Consequently, accurate information can be given to the controller for accurate image analysis and accurate calculation.

In a modification, the photodetecting device 13 may be disposed perpendicularly to the optical axis L' of the lens system 12, and the optical axis L' of the lens system 12 may be deflected within the camera unit 1 with a prism.

What is claimed is:

1. An image processing apparatus comprising:
   a machine tool disposed for actuation along a line which is perpendicular to a plane along which a detection mark lies, wherein the detection mark also intersects said line which is perpendicular to said plane;
   a camera unit including a lens system through which light from the detection mark is received; and
   a photodetecting device disposed in the optical axis of said lens system; wherein the optical axis of said lens system is inclined at a predetermined angle to said perpendicular line to a plane along which the detection mark lies so as not to interfere with the actuation of said machine tool, and the detection mark intersects the optical axis of said lens system, wherein said photodetecting device is inclined at a predetermined angle to the optical axis of said lens system of said camera unit;
   wherein said predetermined angle of inclination of said photodetecting device to the optical axis of said lens system is determined so that $(a+a')=(b+b')$, where a is the length of a section of a light path between a portion of the detection mark on the side of said camera unit and said lens system of said camera unit, a' is the length of a section of the same light path between said lens system and said photodetecting device, b is the length of a section of a light path between a portion of the detection mark diametrically opposite the portion of the side of said camera unit with respect to the center of the detection mark and said lens system, and b' is the length of a section of the same light path between said lens system and said photodetecting device.

2. An image processing apparatus according to claim 1, wherein said machine tool comprises a punch of a punching machine.

3. An image processing apparatus comprising:
   a machine tool disposed for actuation along a line which is perpendicular to a plane along which a detection mark lies, wherein the detection mark also intersects said line which is perpendicular to said plane;
   a camera unit including a lens system through which light from the detection mark is received; and
   a photodetecting device disposed in the optical axis of said lens system; wherein the optical axis of said lens system is inclined at a predetermined angle to said perpendicular line to a plane along which the detection mark lies so as not to interfere with the actuation of said machine tool, and the detection mark intersects the optical axis of said lens system, wherein said photodetecting device is inclined at a predetermined angle to the optical axis of said lens system of said camera unit.

4. An image processing apparatus according to claim 3, wherein said machine tool comprises a punch of a punching machine.

* * * * *